(12) United States Patent
Hao et al.

(10) Patent No.: US 7,768,944 B2
(45) Date of Patent: Aug. 3, 2010

(54) TECHNIQUE FOR DEFINING AND DYNAMICALLY ENABLING SERVICE LEVEL REQUIREMENTS IN A SERVICE ORIENTED ARCHITECTURE

(75) Inventors: Biao Hao, Bedford, TX (US); Shiju Mathai, Carrollton, TX (US); Philip E. Reed, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 11/750,913

(22) Filed: May 18, 2007

(65) Prior Publication Data

US 2008/0285481 A1 Nov. 20, 2008

(51) Int. Cl.
*H04L 12/28* (2006.01)
(52) U.S. Cl. .................. 370/254; 370/230; 709/204
(58) Field of Classification Search ................. 370/254, 370/230; 709/204, 223
See application file for complete search history.

(56) References Cited

U.S. PATENT DOCUMENTS

| | | | |
|---|---|---|---|
| 6,256,771 B1 | 7/2001 | O'Neil et al. | |
| 2004/0093381 A1* | 5/2004 | Hodges et al. | 709/204 |
| 2005/0096949 A1 | 5/2005 | Aiber et al. | |
| 2005/0132381 A1 | 6/2005 | Fiammante et al. | |
| 2005/0283518 A1 | 12/2005 | Sargent | |
| 2008/0155087 A1* | 6/2008 | Blouin et al. | 709/223 |
| 2008/0259791 A1* | 10/2008 | Synnestvedt et al. | 370/230 |

OTHER PUBLICATIONS

Schröpfer, et al., "A Flexible Approach to Service Management-Related Service Description in SOAs," ECOWS'06 European Conference on Web Services, Workshop on Emerging Web Services Technology WEWST06, Preliminary Proceedings, pp. 43-58, Dec. 4, 2006.
Milanovic, N. "Contract-Based Web Service Composition," Dissertation, Humboldt-Universität at Berlin, Jun. 13, 2006.
Wada, et al., "Modeling Non-Functional Aspects in Service Oriented Architecture," Proceedings of the IEEE International Conference on Services Computing, pp. 222-229, Jun. 2006.

* cited by examiner

*Primary Examiner*—Albert T Chou
(74) *Attorney, Agent, or Firm*—Patents On Demand, P.A.; Brian K. Buchheit

(57) ABSTRACT

The present invention discloses a document for formally defining service level requirements in a service oriented architecture (SOA). This document can include a service specification that defines functional attributes and a capability specification that defines performance requirements. These functional attributes and performance requirements can influence the response of the SOA to a service request. For example, a dynamic interpreter of the requirements document can dynamically adjust SOA resources to ensure performance requirements specified in the requirements document are met.

17 Claims, 3 Drawing Sheets

500

| Service Level Requirements 505 | |
|---|---|
| Client Class 507 | Class Description 508 |
| Gold | Real-time quote service has to be used. Quote results have to be delivered with high priority and audited for response time of less than 3 seconds. |
| Silver | Real-time quote service has to be used. Quote results have to be delivered with at least medium priority, but preferably high priority. Quote results do not have to be audited for response time. |
| Bronze | Quote service with 15 minute delay can be used. Quote results can be delivered with low priority. Quote results do not have to be audited for response time. |

| Service Level Profiles 510 | | | | | | |
|---|---|---|---|---|---|---|
| Service Level Profile | Service Specification 513 | | Capability Specification Delivery Priority 516 | | Capability Specification Audit 518 | |
| | Baseline | Preferred | Baseline | Preferred | Baseline | Preferred |
| P_Gold | RealTimeSQ | RealTimeSQ | High | High | Yes | Yes |
| P_Silver | RealTimeSQ | RealTimeSQ | Medium | High | No | No |
| P_Bronze | NormalSQ | NormalSQ | Low | Low | No | No |

512       514

| Client Table 520 | |
|---|---|
| Client ID 521 | Client Class 522 |
| Client001 | Bronze |
| Client002 | Gold |
| Client003 | Silver |
| Client004 | Bronze |

FIG. 5

TECHNIQUE FOR DEFINING AND DYNAMICALLY ENABLING SERVICE LEVEL REQUIREMENTS IN A SERVICE ORIENTED ARCHITECTURE

BACKGROUND

1. Field of the Invention

The present invention relates to the field of service oriented computing and, more particularly, to a technique for defining and dynamically enabling service level requirements in a service oriented architecture (SOA).

2. Description of the Related Art

As enterprise information systems expand in both geography and capability, many businesses have implemented a service oriented architecture (SOA) to provide a consistent and re-usable interface for connecting requesting clients with any business process or information provider. The increase in popularity of SOA has resulted in the creation of a large number of software and middleware components that can be used in implementation. While some SOA solutions require specific software and middleware components, others can support a variety of components and protocols. Further, additional software components exist that can be added to the SOA to provide supplementary functions for governance.

The current implementation of SOA has created an environment that impedes the implementation of service level requirements. Service level requirements are the generic language terms that define the implementation and performance criteria for a specific service, such as provide a real-time update. A service processing environment is typically used to provide a programming interface for a specific middleware component. A disconnect arises between the language used to document service level requirements and the language used by the service processing environment to define like items. That is, a one-to-one correlation does not exist to translate the generic natural language terms of the service level requirement into the terms used by the service processing environment. Therefore, implementing service requirements in a SOA requires in-depth knowledge of the service implementation and infrastructure capabilities of the service processing environment. Even with this in-depth knowledge, an implementer often uses subjective interpretations of the natural language used to define the service level requirements. Code maintainers or SOA architects may re-interpret these loosely specified requirements in the future, which can result in a SOA service malfunctioning.

Because such a detailed level of knowledge is required, enabling service level requirements within a SOA environment incurs a high level of cost. Typically, available SOA knowledgeable personnel are limited. Despite this limitation, SOA knowledgeable personnel are required to design and modify SOA applications and to design and modify SOA infrastructure components. SOA knowledgeable personnel are presently diverted to coordinate with management personnel on requirement modification issues and/or interpretations. Similarly, coordination with these same knowledgeable people is needed to determine an effect of deploying new SOA services and an effect of changing the SOA infrastructure upon existing SOA services and their associated requirements.

What is needed is a means to enable service level requirements within a SOA that does not require in-depth knowledge of service implementation and infrastructure capabilities. Ideally, such a means would utilize a formalized language for defining service level requirements that can be translated into the language used by the service processing environment by an interpreter program at runtime. Therefore, service level requirements would be consistently defined, which also provides a single location for applying modifications, and dynamically applied to each received service request.

SUMMARY OF THE INVENTION

The present invention details a vehicle for defining and dynamically enabling service level requirements in a service oriented architecture (SOA). Service level requirements can be represented in a specialized document called a service level profile (SLP). The SLP can utilize a formalized language within a standardized format that can provide a consistent expression of service level requirements. A SLP handler can utilize the structure and language of the SLP to dynamically adjust the operating conditions of the SOA as service requests are processed.

The present invention can be implemented in accordance with numerous aspects consistent with the material presented herein. For example, one aspect of the present invention can include a document for formally defining service level requirements in a service oriented architecture (SOA). This document can include a service specification that defines functional attributes and a capability specification that defines performance requirements. These functional attributes and performance requirements can influence the response of the SOA to a service request.

Another aspect of the present invention can include a method for implementing service level requirements in a service oriented architecture (SOA). In the method, a service request can be received within a SOA. The service request can include information that identifies the requestor. Using this identifying information, a corresponding service level profile (SLP) can be obtained. The SLP can be interpreted, which can influence the configuration of the responsive service and/or the providing system. After interpretation, the service can be invoked and conveyed to the requestor.

Still another aspect of the present invention can include a handler for service level profiles (SLPs). The handler can include a service level pre-processor and a service level interpreter. The service level pre-processor can be configured to retrieve the SLP from a profile directory that matches a service request. The service level interpreter can be configured to translate the SLP into a set of performance requirements and can dynamically adjust parameters of the SOA to meet the set of performance requirements.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 5 is a collection of sample tables that illustrate the formalized language of service level profiles (SLP) and their use in accordance with an embodiment of the inventive arrangements disclosed herein.

DETAILED DESCRIPTION OF THE INVENTION

Figure 1:
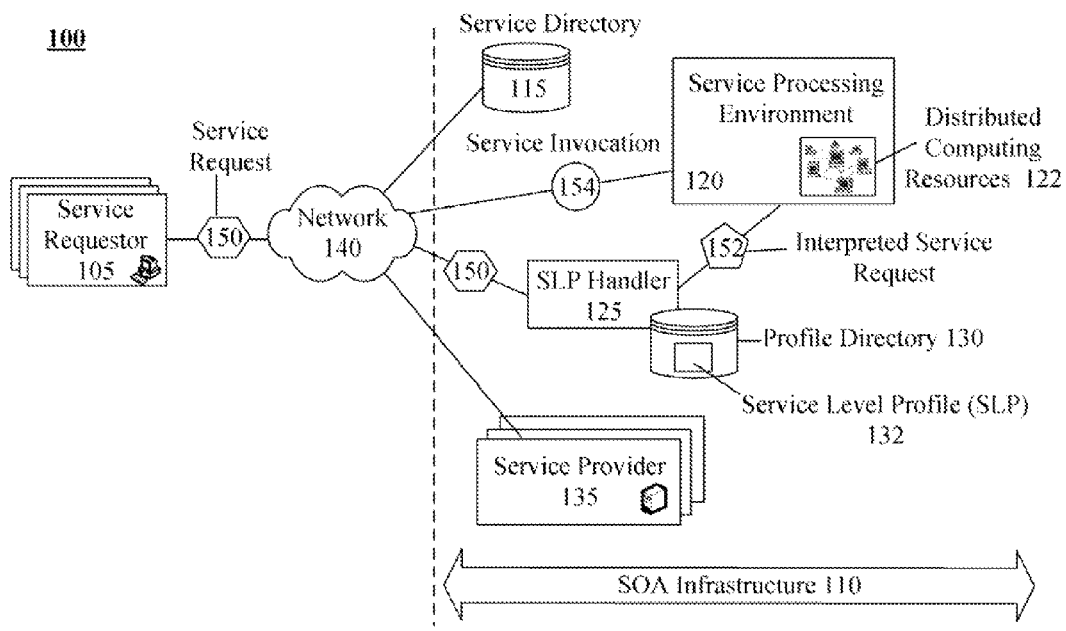
FIG. 1 is a schematic diagram of a system for dynamically enabling service level requirements in a service oriented architecture (SOA) in accordance with an embodiment of the inventive arrangements disclosed herein.

FIG. 1 is a schematic diagram of a system 100 for dynamically enabling service level requirements in a service oriented architecture (SOA) in accordance with an embodiment of the inventive arrangements disclosed herein. In system 100, a service request 150 can be made by a service requestor 105 over a network 140 for fulfillment by a service provider 135 utilizing a SOA infrastructure 110.

The service requestor 105 can represent a computing device having installed software that generates a service request 150 for a service to display or use with the computing device. A service requestor 105 can represent a variety of computing devices that can communicate with the SOA infrastructure 110 over a network 140. For example, software running on a mobile telephone can request weather information for a specified location.

Additionally, many computing devices that are considered a part of an overall computing system, such as the Interact or a corporate intranet, can act as service requestors 105. For example, many Web sites utilize an advertisement service that places various ads on their Web pages. In this example, the server hosting the Web site is the requestor 105 since it requests the ad service from the provider 135, which is a server owned by the ad company.

The SOA infrastructure 110 can include the typical components for handling service requests 150 made by requestors 105, namely, a service directory 115, a service processing environment 120, and a service provider 135. These components 115-135 can be communicatively linked via network 140. In another embodiment, these components 115-135 can communicate via a separate network (not shown) while only one of the components communicates with service requestor 105 over network 140.

In the SOA infrastructure 110, the service request 150 can be received for processing by the service level profile (SLP) handler 125. The service level profile handler 125 can represent a software component configured to process a service request 150 to generate an interpreted service request 152 for fulfillment by the service processing environment 120. To process the service request 150, the SLP handler 125 can retrieve an applicable service level profile 132 from the profile directory 130 and query the service directory 115. Processing of the request 150 can also include taking into account the state of the service processing environment 120 and requestor 105 information, which can be included in the service request 150.

The service directory 115 can be an online directory that provides a uniform way for businesses and organizations to describe available services, service capability, required interface parameters, and output parameters resulting from the described services. In one embodiment, the service directory 115 can use an eXtensible Markup Language (XML) based directory of Web services. Web services specified in the service directory 115 can be described using a Web services description language (WSDL). The service directory 115 can be a universal description discovery and integration (UDDI) directory.

The service level profile (SLP) 132 can represent a formalized data representation of a service level requirement for the SOA. Service level requirements can define the type of implementation to use to provide a requested service and the performance requirements that the service must meet. For example, a service level requirement can specify that a responding service must provide information in real-time. The SLP 132 can represent the parameters specified by a service level requirement in a standardized format that can be used by the SLP handler 125 to produce the interpreted service request 152.

The interpreted service request 152 can be conveyed from the SLP handler 125 to the service processing environment 120 for execution. The interpreted service request 152 can represent instructions, which have been influenced by the service level requirements contained in the SLP 132, for the service processing environment 120 to use in order to provide the service to the requestor 105. For example, the interpreted service request 152 can specify a particular service of a specific service provider 135. The interpreted service request can also detail which resources 122 are to be used for the invoked service 154. Also, the resources 122 can be dynamically adjusted depending upon a load placed upon the environment 120 to handle the various services in accordance with the associated requests 152. In one embodiment, different services provided by the environment 120 can have service specific priority levels associated with them, which are used to determine which resources 122 are dedicated to which services.

The service processing environment 120 can include distributed computing resources 122 representing the hardware, software, and middleware necessary to perform service processing and invocation functions in a SOA computing system. These distributed computing resources 122 can include items that are located in a variety of geographic locations. For example, mirror Web sites located in various states and/or countries can be used to provide better transmission rates for customers in different locations. Additionally, these distributed computing resources 122 can be communicatively linked with additional networks (not shown) and can include a multitude of different operating platforms.

Network 140 can include any hardware/software/and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network, such as the Internet. Network 140 can also include circuit-based communication components and mobile communication components, such as telephony switches, modems, cellular communication towers, and the like. The network 140 can include line based and/or wireless communication pathways.

The service directory 115 and the profile directory 130 can be a physical or virtual storage space configured to store digital information. The directories 115 and 130 can be physically implemented within any type of hardware including, but not limited to, a magnetic disk, an optical disk, a semiconductor memory, a digitally encoded plastic memory, a holographic memory, or any other recording medium. Each of the directories 115 and 130 can be a stand-alone storage unit as well as a storage unit formed from a plurality of physical devices. Additionally, information can be stored within the directories 115 and 130 in a variety of manners. For example, information can be stored within a database structure or can be stored within one or more files of a file storage system, where each file may or may not be indexed for information searching purposes. Further, each directory 115 and 130 can utilize one or more encryption mechanisms to protect stored information from unauthorized access.

Figure 2:
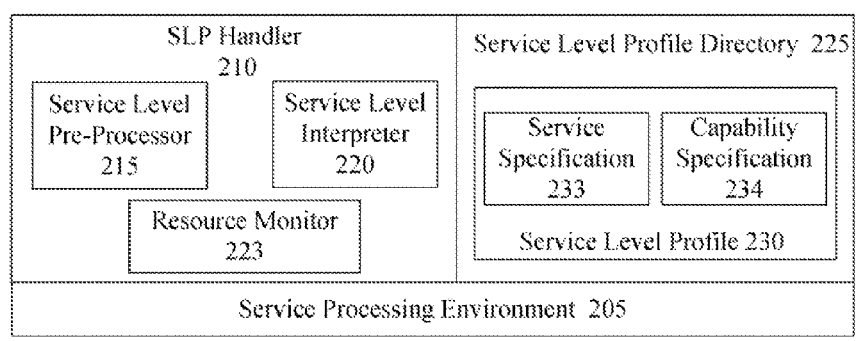
FIG. 2 is an illustration that depicts the internal components of the service level profile (SLP) handler and profile directory and their operational relationship to the service processing environment in accordance with an embodiment of the inventive arrangements disclosed herein.

FIG. 2 is an illustration 200 that depicts the internal components of the service level profile (SLP) handler 210 and profile directory 225 and their operational relationship to the service processing environment 205 in accordance with an embodiment of the inventive arrangements disclosed herein. The contents of illustration 200 can be used within the context of system 100 or any other service oriented architecture (SOA) in order to dynamically enable service level requirements.

As shown in the illustration 200, the SLP handler 210 and the service level profile directory 225 can operate at a level above that of the service processing environment 205. That is, the SLP handler 210 can perform functions that are broader in scope and that can affect multiple service requests, whereas the service processing environment 205 can perform functions that are specific to the processing of a single service request.

For example, the SLP handler 210 can prioritize the processing of received requests prior to passing the associated interpreted request to the service processing environment 205. Additionally, the SLP handler 210 can monitor the load of various servers within the service processing environment 205 to determine on which server to invoke a service.

In order to provide direction to the service processing environment 205, the SLP handler 210 can include a service level pre-processor 215, a service level interpreter 220, and a resource monitor 223. The service level pre-processor 215 can represent a software component of the handler 210 that includes algorithms for determining the applicable service level profile (SLP) 230 for a service request and retrieving it from the SLP directory 225. Selection of the pertinent SLP 230 can be based on a variety of criteria, including, but not limited to, an identifier of the requestor, the state of the overall system, a business rule or requirement, an internal procedure, and the like.

In order to create relationships between factors and identifiers within the SLP 230, the pre-processor 215 can be given permission to access the data stores of other business systems (not shown). For example, the pre-processor 215 can lookup the service level of a requestor in a customer relationship management (CRM) database to determine which of the SLPs 230 that are based on service level is applicable to the service request.

It should be noted that the algorithms of the service level pre-processor 215 create an environment in which the service level requirements contained within the SLPs 230 are consistently applied to all service requests.

A SLP 230 can be comprised of a service specification 233 and a capability specification 234. The service specification 233 can be a section of formalized data defining the nature and type of the service provider that implement the service. For example, the service specification 233 can specify that the service provider should update information in real-time, near real-time, or with certain amount of delay.

The capability specification 234 can be a section of formalized data defining the performance requirements for the provided service. For example, the capability specification 234 can specify a priority for fulfilling the interpreted service request or a degree of processing that should be taken when handling the service request.

The service level interpreter 220 can represent a software component of the handler 210 that interprets the contents of the SLP 230, modifies the service request to convey the interpretation, and/or adjusts system resources to meet service delivery requirements. That is, the interpreter 220 can execute algorithms that translate the data of the SLP 230 into instructions for the service processing environment 205 to execute. For example, the interpreter 220 can translate the requirement for a real-time service in the SLP 230 by addressing the request to server "known" to run the requested service at a real-time rate. Alternately, the interpreter 220 can set the value of an attribute within the request that is understood by the processing environment 205 to represent the service rate (e.g., service_rate=real-time).

By utilizing resource data from the resource monitor 223, the interpreter 220 can adjust the allocation of system resources in order to provide the requested service. That is, the interpreter 220 can increase the granularity of instructions given to the service processing environment 205, as well as provide additional guidance. For example, when a specific service is highly requested, as indicated by the server loads reported by the resource monitor 223, the interpreter 220 can instruct the service processing environment 205 to transfer running services to servers that are geographically closest to the requestor (i.e., move all Oregon requests from the Florida server to the California server) in order to meet the requirements of an incoming Florida service request. Alternately, the interpreter 220 can direct the use of reserve servers as service providers to accommodate high volume.

The resource monitor 223 can be a software component that provides information that pertains to the state of the system to the service level pre-processor 215 and/or interpreter 220. The resource monitor 223 can report on system resources such as available communication media, available bandwidth, available CPU cycles, server loads, and the like.

In an alternate embodiment, the resource monitor 223 can be implemented as multiple monitors (not shown) within the service processing environment 205, such as a monitor for each geographic location of resources, that can report information to the resource monitor 223 within the SLP handler 210.

Figure 3:
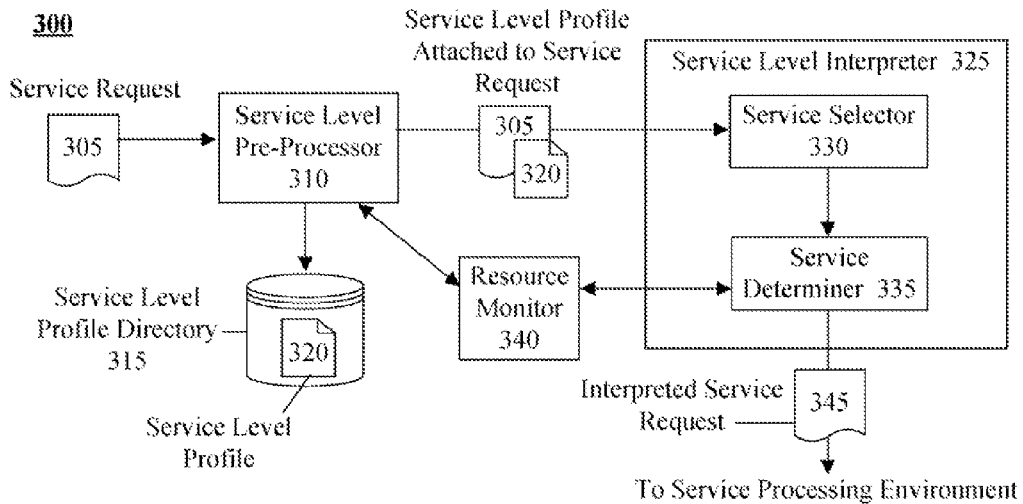
FIG. 3 is a schematic diagram of a process illustrating interactions between the components of the service level profile (SLP) handler processing a service request in accordance with an embodiment of the inventive arrangements disclosed herein.

FIG. 3 is a schematic diagram of a process 300 illustrating interactions between the components of the service level profile (SLP) handler processing a service request in accordance with an embodiment of the inventive arrangements disclosed herein. Process 300 can be performed in the context of system 100 and/or utilizing the relational structure of illustration 200.

Process 300 can begin with the receipt of a service request 305 by the service level pre-processor 310. The service level pre-processor 310 can query the resource monitor 340 to receive information regarding the current resource state of the system. Utilizing the resource information and the contents of the service request 305, the pre-processor 310 can determine which service level profile (SLP) 320 is applicable to the request 305.

The applicable SLP 320 can then be retrieved from the SLP directory 315 and attached to the service request 305. The service request 305 and the SLP 320 can then be passed to the service level interpreter 325. Interpretation of the service request 305 and SLP 320 by the service level interpreter 325 can utilize a service selector 330 and a service determiner 335.

The service selector 330 can be a component of the interpreter 325 configured to select a service whose implementation matches the specification in the SLP 320. For example, the request 305 can be for a stock quote and the SLP 320 can specify that this specific requestor requires a real-time service from Company A. Thus, the service selector 330 can note the selection for a service from Company A that provides a real-time stock quote service.

Then, the service determiner 335 can determine how to meet the performance requirements specified in the capability specification of the SLP 320 for the selected implementation. The service determiner 335 can utilize data from the resource monitor 340 when making the determination. For example, by examining the current server loads, the determiner 335 can ascertain which server can provide the necessary performance requirements for the service request 305.

The instructions pertaining to the service implementation and performance requirements to fulfill the service request 305 can be placed within the interpreted service request 345 by the service selector 330 and service determiner 335. The interpreted service request 345 can then be conveyed to the service processing environment for execution and fulfillment.

Figure 4:
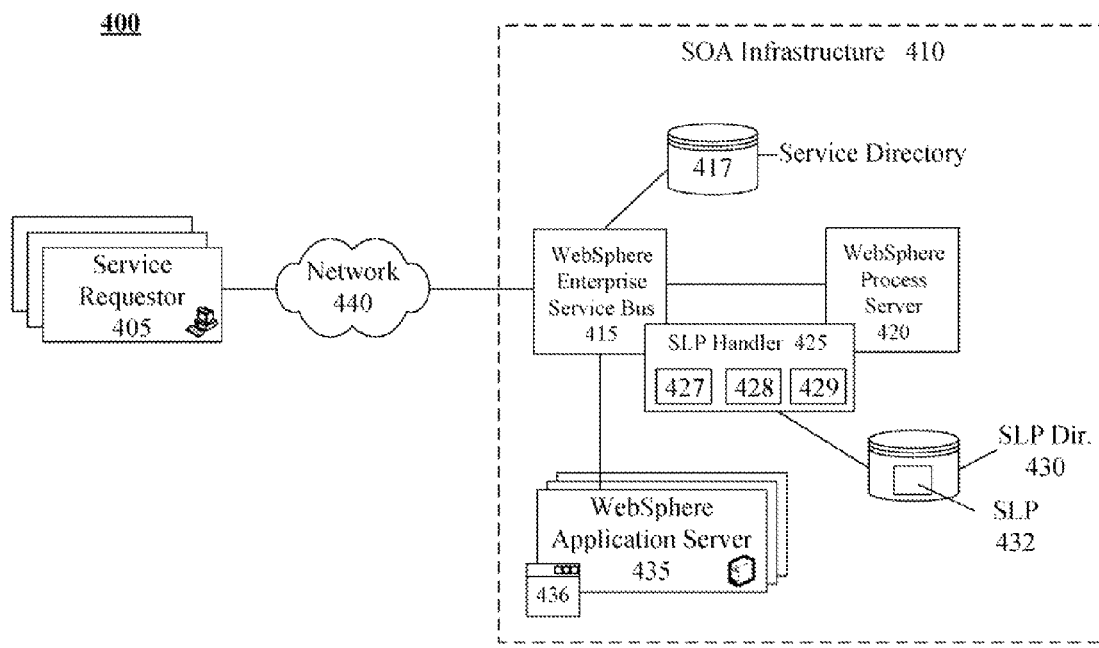
FIG. 4 is a schematic diagram of a system illustrating a specific implementation for dynamically enabling service level requirements in a service oriented architecture (SOA) in accordance with an embodiment of the inventive arrangements disclosed herein.

FIG. 4 is a schematic diagram of a system 400 illustrating a specific implementation for dynamically enabling service level requirements in a service oriented architecture (SOA) in accordance with an embodiment of the inventive arrangements disclosed herein. System 400 can be an implementation of system 100 utilizing WebSphere components. It should be noted that although this example depicts a service requestor 405 that is external to the SOA infrastructure 410, a service requestor 405 can also be a computing device within the SOA 410.

In system 400, service requestor 405 can request a service from the SOA infrastructure 410 over a network 440. The SOA infrastructure 410 can consist of a WebSphere Enterprise Service Bus (ESB) 415, a service directory 417, a WebSphere process server 420, a service level profile (SLP) handler 425 with an associated SLP directory 430, and a WebSphere application server 435.

The WebSphere ESB 415 can provide the communications infrastructure between the other components of the SOA 410. When the WebSphere ESB 415 is coupled with the WebSphere process server 420, these components 415 and 420 can provide the functions necessary for the execution of service request similar to the service processing environment 120 of system 100.

Since the functions of the SLP handler 425 overlay the service processing environment, the handler 425 can exist as a component whose implementation spans both the WebSphere ESB 415 and process server 420. This configuration can allow the service level pre-processor 427, the service level interpreter 428, and the resource monitor 429 components of the SLP handler 425 to have access to the functions of the ESB 415 and process server 420 as well as the data contained within the SLPs 432 of the SLP directory 430 when processing service requests.

Once the SLP handler 425 addresses an incoming service request, execution instructions can be conveyed to the ESB 415 and/or process server 420, as required. When fulfilling a service request, the ESB 415 can use the service directory 417 to locate the necessary service provider, such as a WebSphere application server 435. The WebSphere application server 435 can then provide the service requestor 405 with a service application 436 via the ESB 415 and network 440.

FIG. 5 is a collection 500 of sample tables 505, 510, and 520 that illustrate the formalized language of service level profiles (SLP) and their use in accordance with an embodiment of the inventive arrangements disclosed herein. It should be noted that the data contained within these tables 505-520 are for illustrative purposes only and are not meant as representation of implementation or as an exhaustive listing.

Table 505 can contain data representing service level requirements prior to implementation within a service oriented architecture (SOA) environment. This service level requirements table 505 can contain data describing a client class 507 and a description 508 of the class.

As shown in this example, the list of identifiers defining the client classes 507 can include gold, silver, and bronze. Each client class 507 can have an associated description 508 that can describe the type of service to be provided to clients associated with that class.

The description 508 can be written using terminology that is generic and easy for people to understand. Additionally, terminology can differ depending on the person who writes the description 508, though the meaning of the description can be preserved. For example, Mr. X writes service level requirements using the term "real-time", whereas Mr. Z uses is "instantaneous response". Regardless of terminology, the components of a SOA cannot comprehend natural language terminology.

In order to understand the meaning of a written description 508, a computing system can require additional assistance. Currently, such assistance can require highly trained personnel who are intimately familiar with the SOA to translate the written words into terms and values that can be understood by the system. A service level profile, such as those shown in table 510, can help to relieve this burden by providing a formalized structure that utilizes standardized terminology.

Table 510 contains example service level profiles that correspond to the written descriptions 508 of table 505 (e.g. the P_Gold service level profile 512 corresponds to the gold client class 507). The correlation between the written description 508 and the data fields of the service level profile table 510 can be illustrated using the gold client class 507 as an example.

As previously noted, the gold client class 507 can be translated into a service level profile 512 with the identifier P_Gold. The first sentence of the description 508, "Real-time quote service has to be used" can be translated into the service specification 513 as the value "RealTimeSQ". Entries in the service specification 513 and capability specification 514 can include baseline and preferred values to denote preferences between different levels of requirements. Since a real-time service is always required, both the baseline and preferred values of the service specification 513 can be set to "RealTimeSQ".

The entries and values of the capability specification 514 can represent the second sentence of the description 508, "Quote results have to be delivered with high priority and audited for response time of less than 3 seconds". The high priority of delivery requirement can be expressed in the delivery priority attribute 516 and the auditing requirement can be expressed in an audit attribute 518.

Once all the written service level requirements of table 505 are translated into the service level profiles of table 510, the identifiers 512 for the service level profiles can be used in tables, such as client table 520. The client table 520 can contain associations between client IDs 521 and client classes 522. This table 520 can be used by the pre-processor of the SLP handler to determine which SLP of table 510 to use based on the client ID 521, which can be included in the service request.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for formally defining service level requirements comprising:
   a tangible storage medium comprising a service level profile document, wherein said service level profile document comprises:
   a service specification of said document which defines functional attributes and associated values for providing a service responsive to a service request in a service oriented architecture (SOA), wherein each service of the service specification comprises a baseline value and a preferred value, where a baseline value is a value for a minimum acceptable service level and wherein the preferred value is a value at least as great as the baseline value that is a value for a desired service level; and
   a capability specification of said document which defines performance requirements and associated values for the provided service, wherein each performance requirement of the capability specification comprises a baseline value and a preferred value, where a baseline value is a value for a minimum acceptable performance level and wherein the preferred value is a value at least as great as the baseline value that is a value for a desired performance level, and
   computing equipment operable to read the service level profile document and to provide the service in accordance with the functional attributes and the performance requirements defined in the service level profile document.

2. The system of claim 1, further comprising:
   an interpretation component implemented within a program stored in a tangible storage medium, said interpretation component for concurrently receiving a service request and said service document; for generating an interpreted service request responsive to receiving the service request and the service document; and for conveying the interpreted service request to a service processing environment for execution and fulfillment, wherein said interpretation component utilizes the functional attributes of the service specification to select infrastructure components that implement the service and utilizes the performance requirements of the capability specification to determine a set of system parameters of a service processing environment to meet the defined performance requirements, wherein the selected infrastructure components and the determined set of system parameters are placed within the interpreted service request.

3. The system of claim 2, wherein a selection of the infrastructure components is based on a level of quality for the service, a geographic location from which to acquire the service, and a specified provider from which to acquire the service.

4. The system of claim 2, wherein the set of system parameters comprises a delivery time frame of the service, a time audit for the service, and a level of resource management allowed to provide the service.

5. The system of claim 1, wherein the associated values of the functional attribute and the performance requirement are expressed as one of a group comprising a numeric value, a range of numeric values, a text string, and a BOOLEAN value.

6. The system of claim 1, wherein the service specification and capability specification comprise a service level profile, wherein the service level profile is written in a formalized language that expresses a service level requirement of the SOA, whereby service level requirements are abstracted from service implementation code and infrastructure specifics of the SOA, wherein the formalized language is interpreted by an interpretation component that dynamically adjusts a set of environmental conditions of a service processing environment, wherein the adjustment of the environmental conditions results in the fulfillment of the service level requirement for the service.

7. The system of claim 1, wherein the service level profile is a client classification specific service level profile, wherein different clients are associated with different client classifications.

8. A method for implementing service level requirements in a service oriented architecture comprising:
   receiving a service request within a service oriented architecture (SOA), wherein the service request contains information specific to a requestor;
   querying a table to determine a client classification for the requestor, wherein a plurality of different client classifications exist within the table for different requestors, wherein different ones of the different client classifications correspond to a higher or lower level of service;
   obtaining a service level profile that corresponds to the requestor and the client classification, wherein the service level profile defines a set of parameters for fulfilling the service request;

interpreting the service level profile, wherein the set of parameters is used to configure elements of a service and a system that provides the service;

invoking the service in response to the interpreting step, wherein the invoking comprises:

determining a current state of system resources;

comparing the current resource state against corresponding parameters of the service level profile, when the current resource state is insufficient, adjusting at least one infrastructure component of the SOA involved in providing the service to comply with the parameters, wherein the comparing and adjusting steps are repeated until the current resource state complies with the parameters, wherein the resource includes at least one of available bandwidth, CPU cycles, and available power; and conveying the service to the requestor.

9. The method of claim 8, wherein the steps of claim 8 are performed in a runtime environment in real-time.

10. The method of claim 8, wherein the service level profile is written in a formalized language, wherein the interpreting step utilizes an interpretation component capable of adjusting performance parameters of the SOA to interpret the formalized language, wherein the formalized language includes a set of operating parameters, wherein the set of operating parameters includes at least one of a delivery time frame of the service, a time audit for the service, and a level of resource management allowed to provide the service.

11. The method of claim 8, passing the service request and the service level profile to a service level interpreter component implemented within a program stored in a tangible storage medium;

the service level interpreter component generating an interpreted service request responsive to receiving the service request and the service document, wherein the interpreted service request comprises results of the interpreting step, which include data for selected infrastructure components of said system that provides the service and a determined set of parameters for configuring elements of the system that provides the service; and the service level component conveying the interpreted service request to a service processing environment, which comprises the system that provides the service, wherein the invoking of the service occurs in response to the system that provides the service receiving and responding to the interpreted service request.

12. A handler for service level profiles comprising:

a service level pre-processor configured to retrieve a service level profile from a profile directory where different service level profiles are retrieved depending upon a client classification of a requestor of a service, wherein the service level profile pertains to a received service request from the requestor in a service oriented architecture (SOA); and a service level interpreter configured to receive the service request and the service level profile associated with the service request as determined from by the service level pre-processor, to translate the service level profile into a set of performance requirements and to determine system parameters of the SOA that ensure that the set of performance requirements are satisfied, and to generate an interpreted service request that comprises the set of performance requirements and determined system parameters; and to convey the generated interpreted service request to a service processing environment for execution and fulfillment.

13. The handler of claim 12, further comprising:

a resource monitor configured to provide the service level interpreter with a current level of system resources available to provide the service.

14. The handler of claim 13, wherein the system resources surveyed by the resource monitor include at least one of available bandwidth, CPU cycles, and available power, wherein a provisioning of available system resources and an adjusting of system parameters occurs in a runtime environment in real-time.

15. The handler of claim 12, wherein said service level profile is a document stored in a tangible storage medium comprising:

a service specification of said document which defines functional attributes and associated values for providing a service responsive to a service request in a service oriented architecture (SOA), wherein each service of the service specification comprises a baseline value and a preferred value, where a baseline value is a value for a minimum acceptable service level and wherein the preferred value is a value at least as great as the baseline value that is a value for a desired service level; and a capability specification of said document which defines performance requirements and associated values for the provided service, wherein each performance requirement of the capability specification comprises a baseline value and a preferred value, where a baseline value is a value for a minimum acceptable performance level and wherein the preferred value is a value at least as great as the baseline value that is a value for a desired performance level.

16. The handler of claim 12, wherein the service level interpreter further comprises:

a service selection component configured to select an implementation of the service, wherein selection is based upon a service specification element of the service level profile; and a service determination component configured to determine a performance of the service implementation, wherein determination is based upon a capability specification element of the service level profile.

17. The handler of claim 12, wherein the service level profile is written in a formalized language that includes a set of operating parameters, wherein the set of operating parameters includes at least one of a delivery time frame of the service, a time audit for the service, and a level of resource management allowed to provide the service.

* * * * *